Sept. 29, 1931.  A. E. DRISSNER  1,825,056
MECHANICAL MOVEMENT
Filed Sept. 24, 1925   10 Sheets-Sheet 1
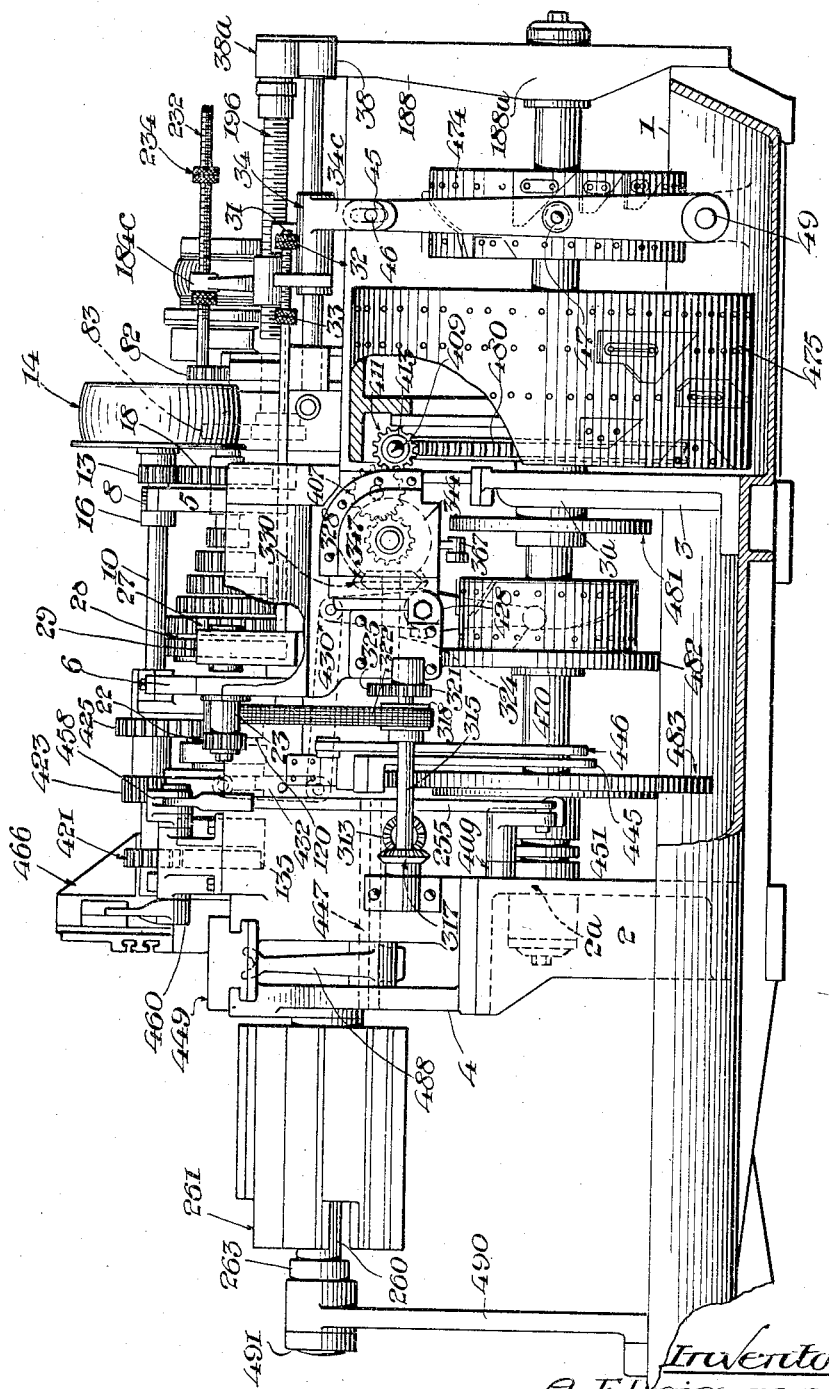

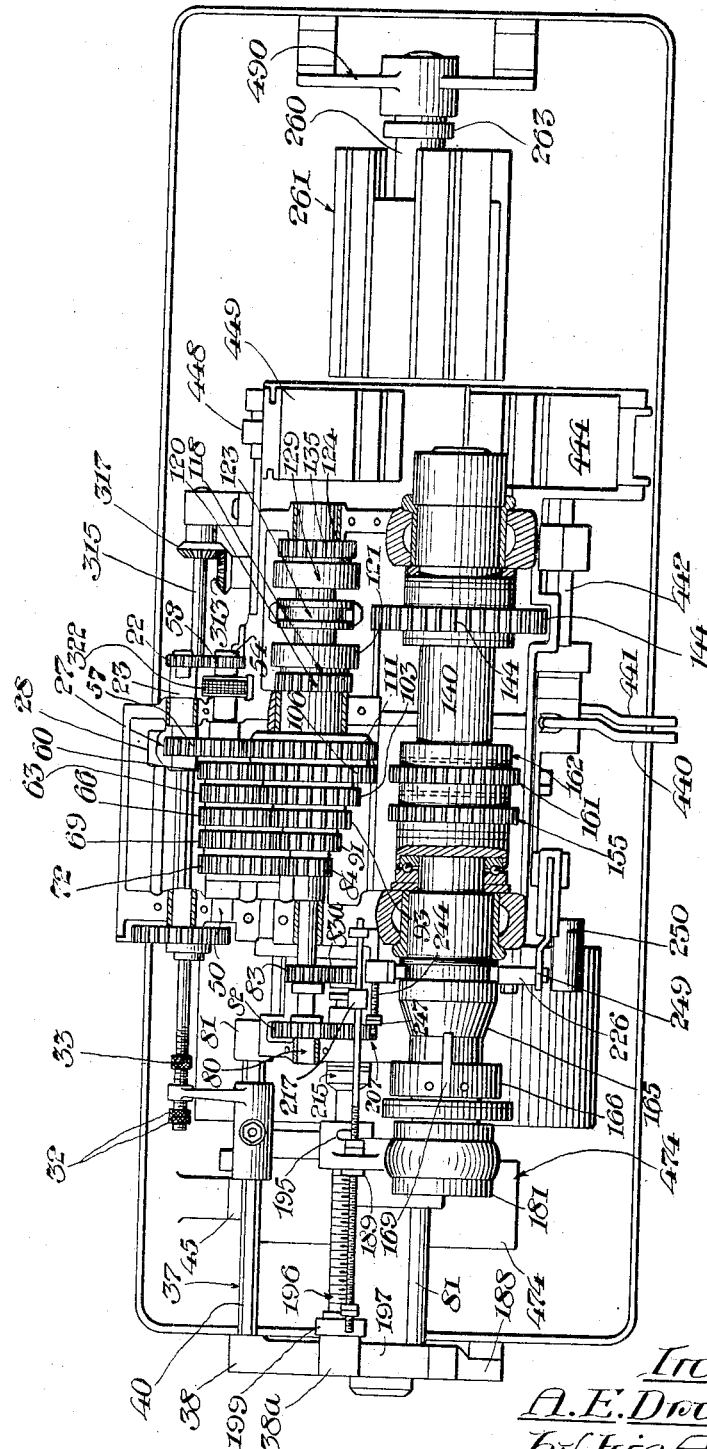

Sept. 29, 1931.  A. E. DRISSNER  1,825,056
MECHANICAL MOVEMENT
Filed Sept. 24, 1925   10 Sheets-Sheet 3
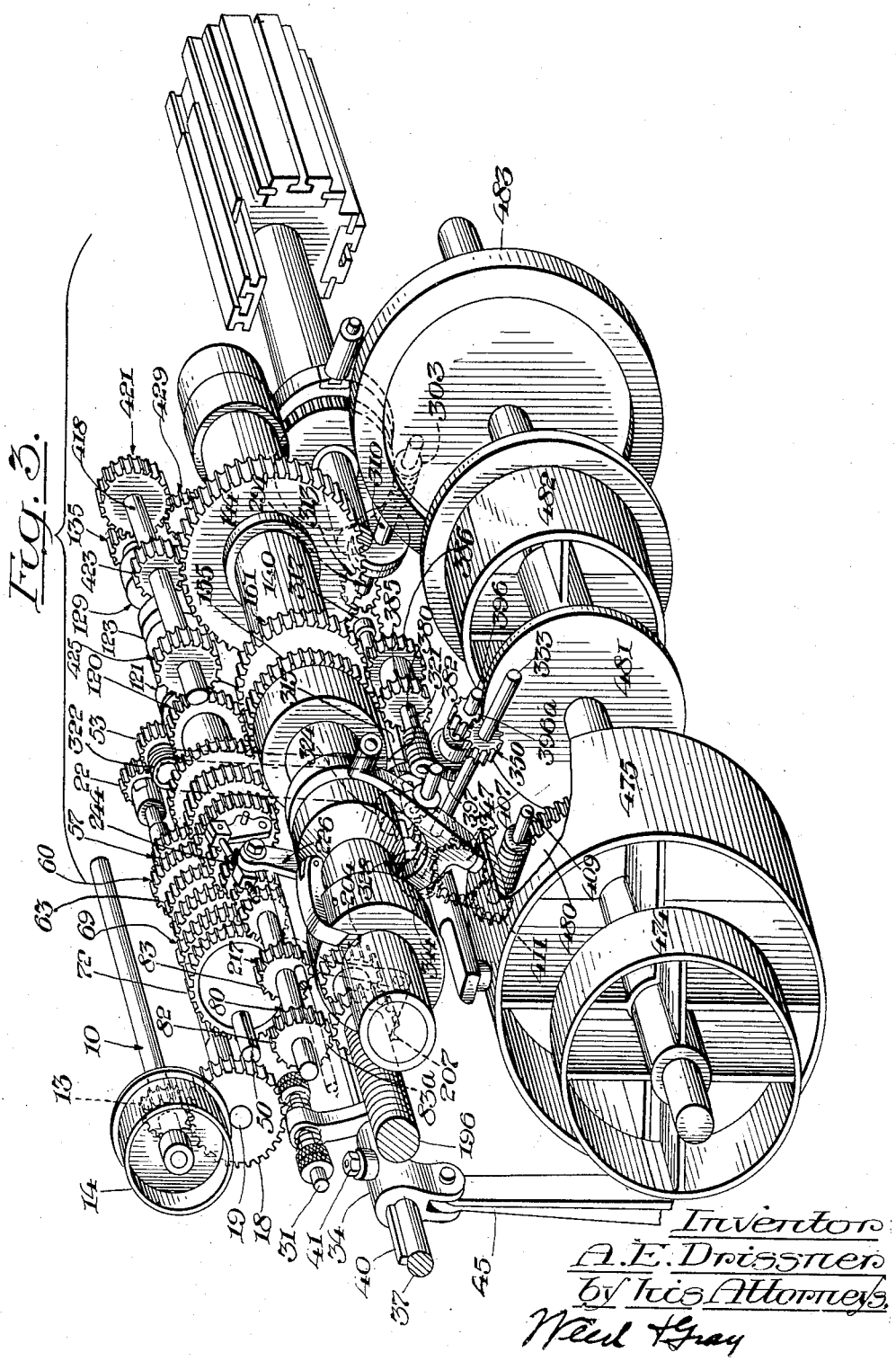

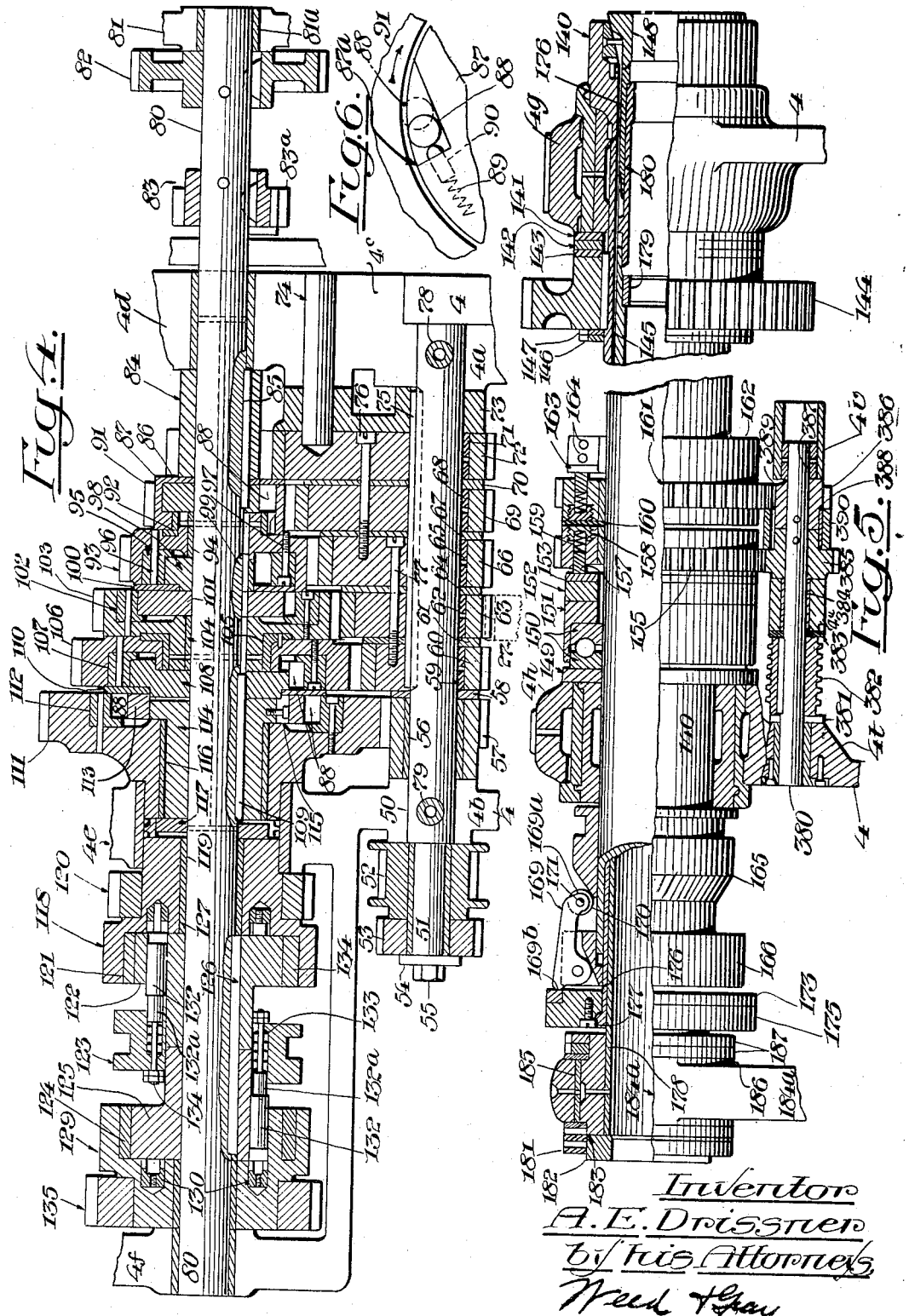

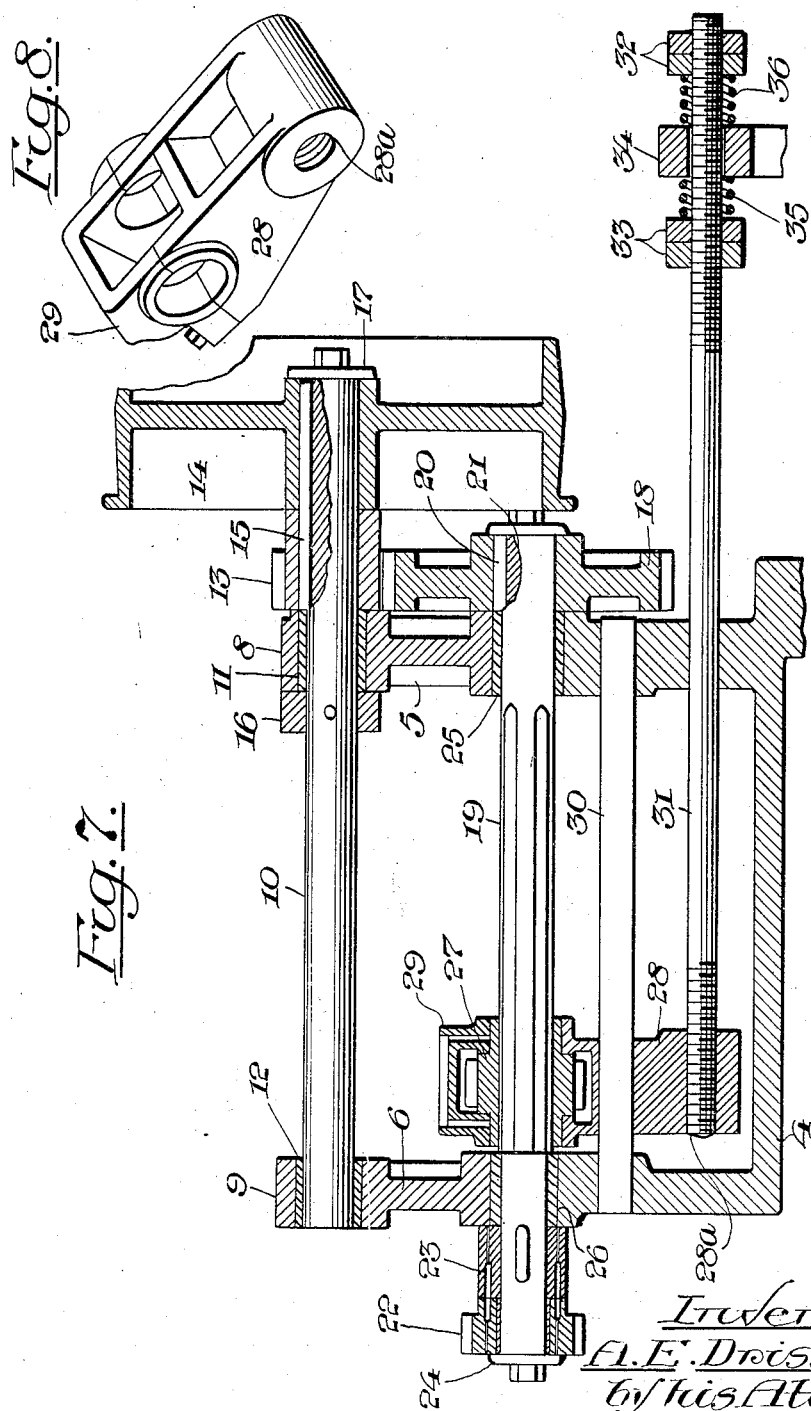

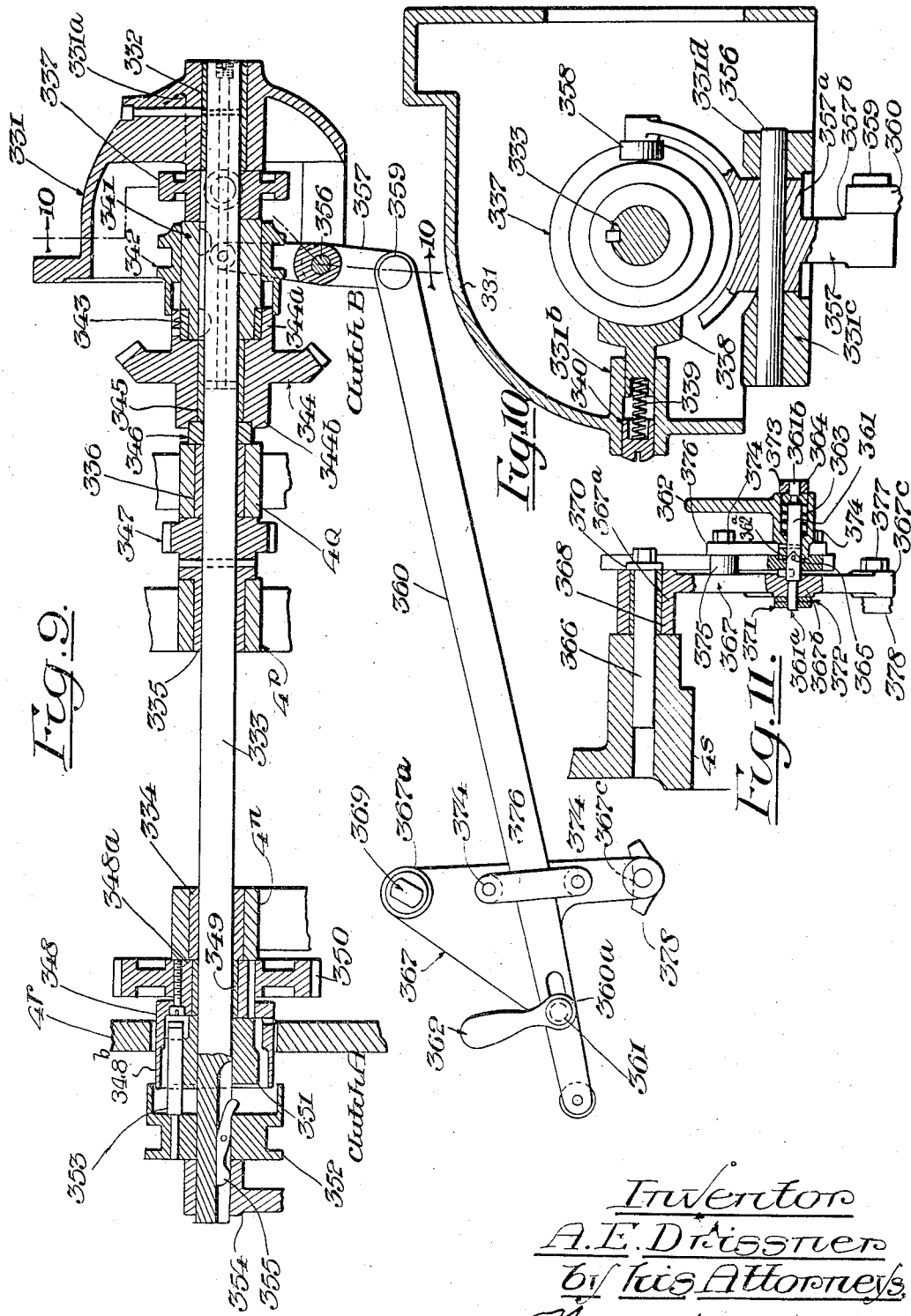

Sept. 29, 1931.  A. E. DRISSNER  1,825,056
MECHANICAL MOVEMENT
Filed Sept. 24, 1925  10 Sheets-Sheet 7
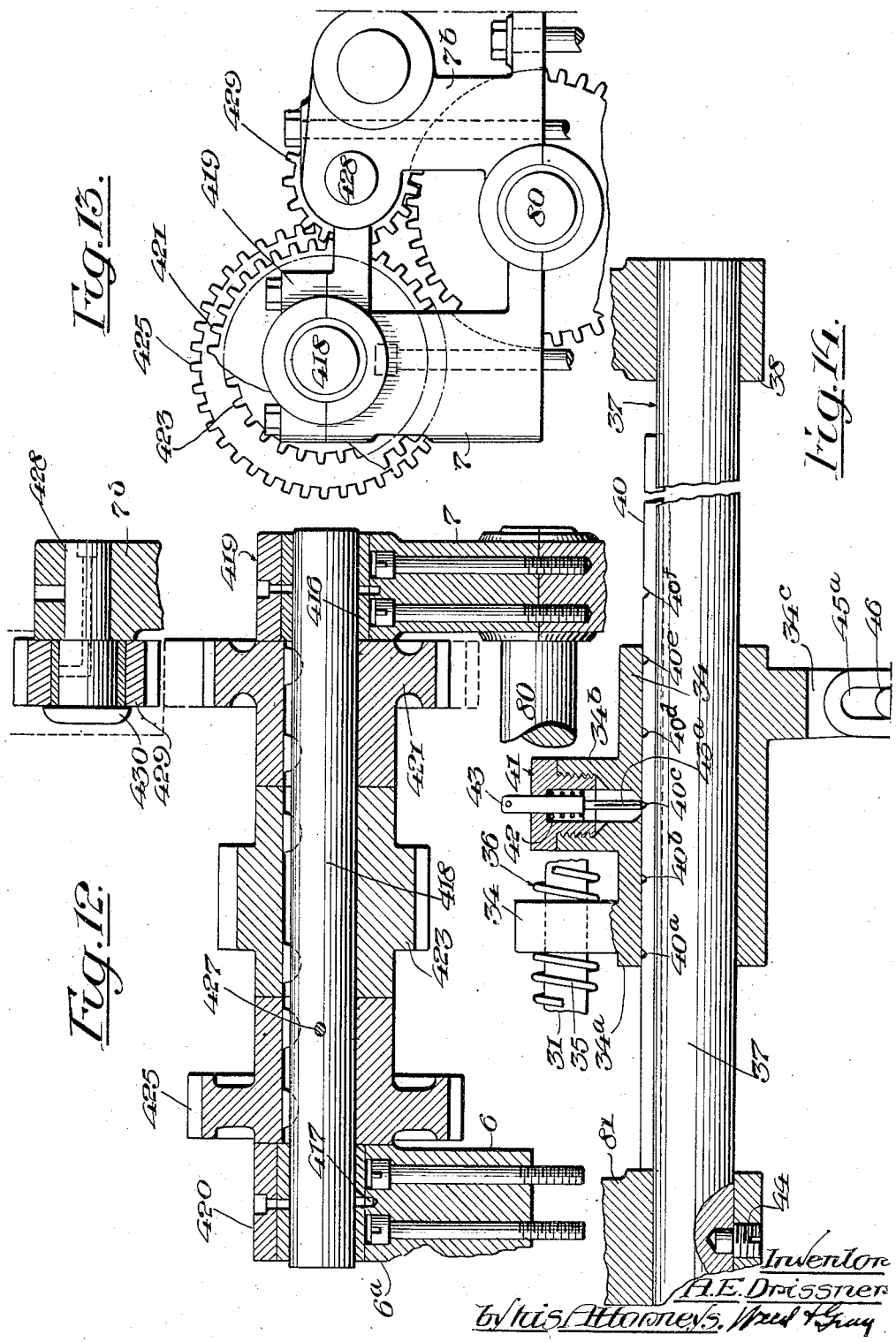

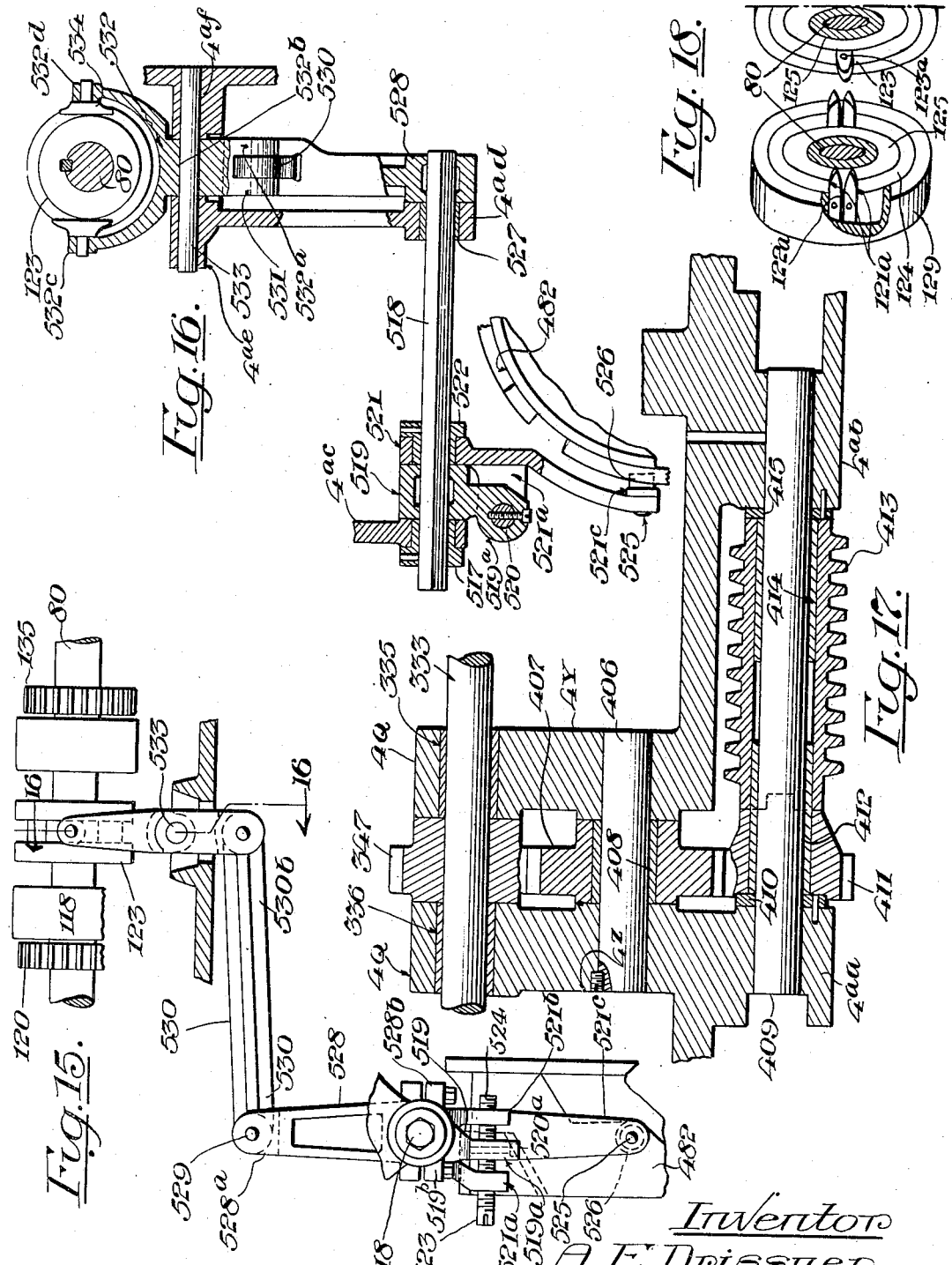

Sept. 29, 1931. A. E. DRISSNER 1,825,056
MECHANICAL MOVEMENT
Filed Sept. 24, 1925 10 Sheets-Sheet 9

Inventor
A. E. Drissner
by his Attorneys
Weed & Gray

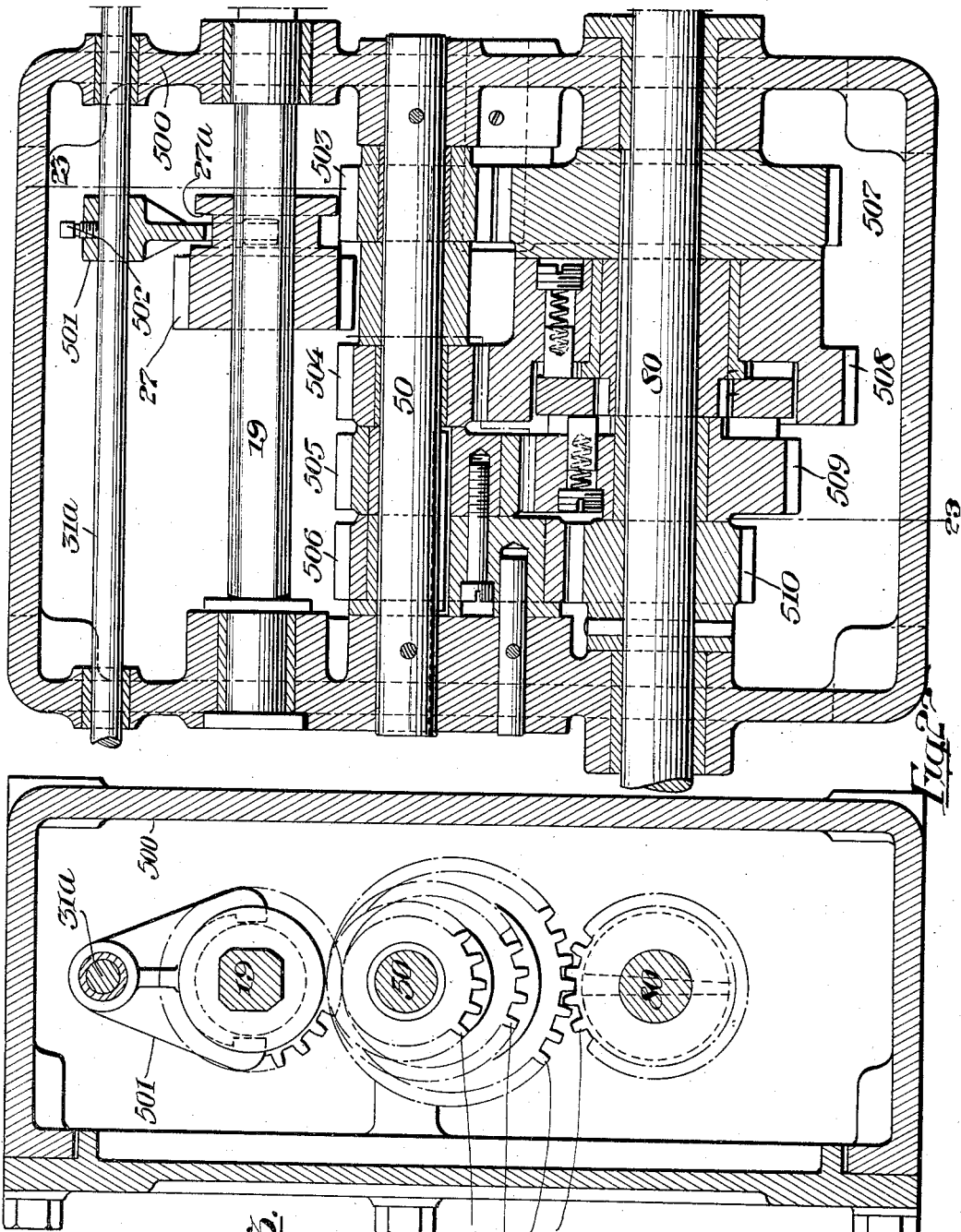

Patented Sept. 29, 1931

1,825,056

UNITED STATES PATENT OFFICE

ALFRED E. DRISSNER, OF CLEVELAND, OHIO, ASSIGNOR TO THE NATIONAL ACME COMPANY, OF CLEVELAND, OHIO, A CORPORATION OF OHIO

MECHANICAL MOVEMENT

Original application filed December 6, 1921, Serial No. 520,287. Divided and this application filed September 24, 1925. Serial No. 58,235.

This invention relates to mechanical movements, and more particularly to improved variable speed mechanism whereby a driven shaft or rotatable member, such as a spindle may be operated at different speeds from a driving or main shaft, an object of the invention being to provide improved mechanism for transmitting power from one shaft to another at different speeds in one or both directions, and wherein this may be controlled automatically or by hand.

Figure 19:
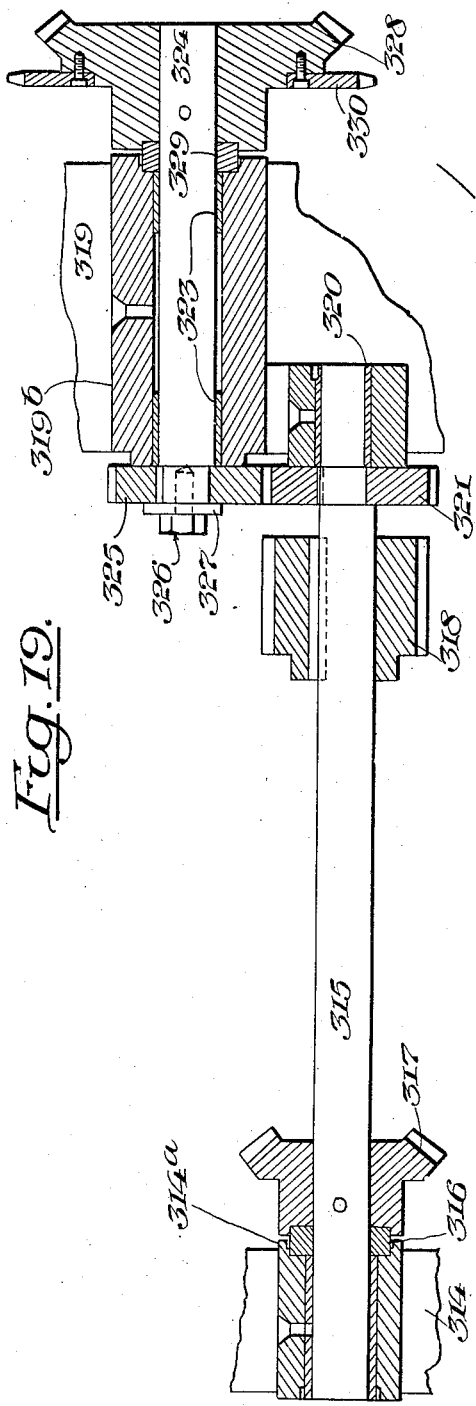
Figure 21:
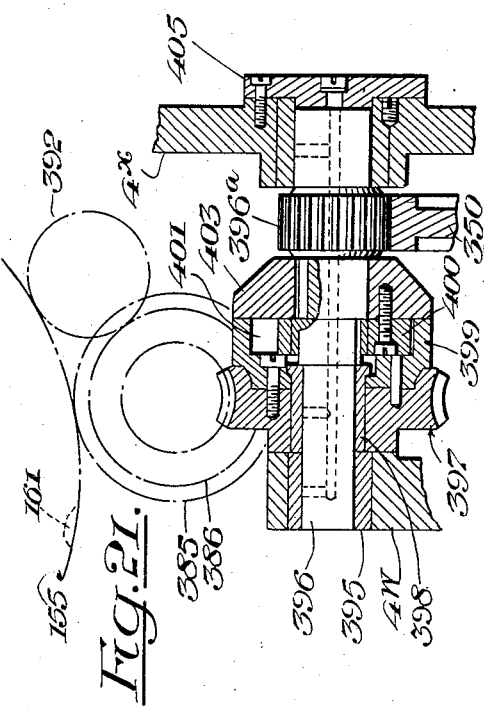
Figure 20:
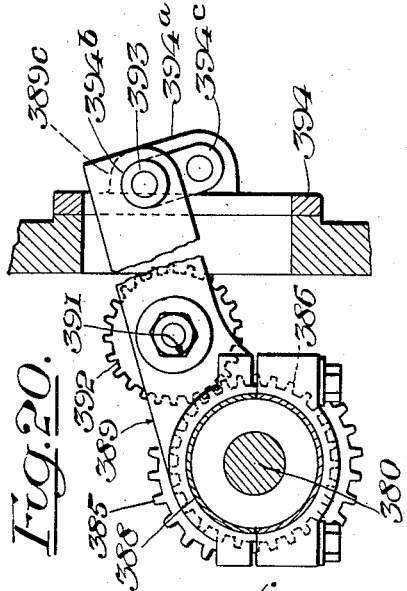

Other objects of this invention will appear in the following description or appended claims, reference being had to the accompanying drawings forming a part of this specification, wherein like reference characters indicate corresponding parts in the several views, and wherein Fig. 1 is a side elevation of a machine embodying my invention; Fig. 2 is a top plan view of the machine partly in section; Fig. 3 is a perspective view in diagrammatic form illustrating the assemblage of the various gears and shafts; Fig. 4 is a top sectional view of the improved gear transmission mechanism for the main spindle; Fig. 5 is a sectional view of the main spindle and a part of the power feed; Fig. 6 is a detail view of the roller clutch used in connection with the gear transmission mechanism; Fig. 7 is a sectional view of the main pulley drive and the automatically shiftable gear of the variable speed mechanism; Fig. 8 is a perspective detail view of the automatic change speed actuator or gear housing shown in Fig. 7; Fig. 9 is a sectional view of the clutch shaft mechanism; Fig. 10 is a sectional view taken on lines 10—10 of Fig. 9; Fig. 11 is a detail sectional view of the clutch operating means shown in Fig. 9: Fig. 12 is a sectional view of part of the main spindle driving mechanism; Fig. 13 is a right-hand end view of the mechanism shown in Fig. 12; Fig. 14 is a partly sectional view of the means for operating the shiftable gear in the power transmission mechanism whereby the speeds of the spindle may be varied; Fig. 15 is a view of the lever mechanism operating the friction and positive clutch mechanism; Fig. 16 is a cross sectional view taken on line 16—16 of Fig. 15; Fig. 17 is a cross sectional view of the cam shaft driving mechanism; Fig. 18 is a fragmentary perspective view partly in section illustrating the friction parts of the double friction clutch mechanism; Fig. 19 is a sectional view of the driving means for the fast feeding and indexing mechanism; Fig. 20 is a view illustrating the reverse spindle drive control shown in Fig. 5; Fig. 21 is a partly sectional view of a power feed mechanism connected with cross shaft 333 for driving the cam shaft; Fig. 22 is a longitudinal vertical section and Fig. 23 is a transverse section of a gear box housing inclosing the transmission mechanism in accordance with my invention.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

The invention in the present instance is embodied by way of example, in an automatic single spindle or turret lathe, but it will be undersood that other adaptations or uses of the invention may be readily made in various types of machines without departing from the spirit of the invention.

This invention is a division of my copending allowed application for automatic single spindle or turret lathe machine, Serial No. 520,287, filed December 6, 1921, and assigned to The National Acme Company.

The present machine comprises an oil pan 1, upon which are secured two columns 2 and 3, and a frame 4 is mounted on these columns. This frame supports suitable brackets 5 and 6 and forms a rigid base for a large part of the mechanism of the machine.

*The main driving mechanism and sliding gear*

On the top of the two brackets 5 and 6 caps 8 and 9 (see Figs. 1 and 7) are securely mounted and are of such a design in connection with the brackets that they form split bearings. Bushings 11 and 12 are pressed into these split bearings, and freely running in these bushings is the main pulley shaft 10. This pulley shaft projects to the rear of bearing 8, and on this shaft is mounted the back gear 13 and main driving pulley 14, both being keyed to shaft 10 by a key 15. A collar 16, fitted and pinned to shaft 10, and a washer 17, secured to end of shaft 10 by a suitable screw, hold in place the pulley 14, back gear 13, and shaft 10. All the movements of this improved machine are obtained from this main driving pulley 14.

The split bearings at 5 and 6 (see Fig. 7) are also bored and in these are pressed bushings 25 and 26. Bushing 25 is bored to receive a rotatable shaft 19, and bushing 26 is bored to receive a turned down end of this shaft 19. A back gear 18 fits one end of shaft 19, being keyed thereon by key 20; and held in place by a washer 21 and screw. Gear 18 meshes with gear 13 forming the back gears of the machine and in place of these gears just mentioned other sets of different sizes may be used in place of those shown, and thus a wide range of speed for shaft 19 is obtained. Shaft 19 between bearings 5 and 6 is machined hexagonally and a gear 27 is broached so as to freely slide thereon. This gear could be bored instead of broached and fit on shaft 19, which would then be round with a long key instead of hexagon; but this is undesirable owing to the fact that the gear would always have a tendency to bind on the key when operating. This difficulty is overcome by the use of a hexagon shaft.

The turned down end of shaft 19 projects beyond bearing 6 and on this is mounted and keyed a driving sleeve 23. This sleeve at one end is drilled and counterbored so as to receive part of two safety pins. Adjacent this sleeve is a gear 22 bored to receive a bushing, which in turn is bored to fit shaft 19 and freely runs thereon. Gear 22 is counterbored to receive the other part of the two safety pins mentioned above, and together with sleeve 23 are held in place by means of washer 24 and a screw. A cap 29 is secured to a bracket 28 (see also Fig. 8) and forms a housing for gear 27, thus forming an actuator to control the sliding gear. This bracket 28 is bored to receive a stationary shaft 30, on which it freely slides. This shaft is supported by the frame 4 under bearings at 5 and 6. The bracket 28 at 28a is tapped to receive one end of rod 31, which is partly supported and freely slides thru a hole in frame 4 under bearing at 5. The other end of this rod 31 is threaded a suitable distance. On the threaded end of rod 31 two sets of adjustable lock nuts 32 and 33 and two springs 35 and 36 are mounted. Between these springs is the boss of a slide 34 (see also Figs. 1 and 14) bored to fit rod 31 so that it may slide thereon. This lever at 34a (see Fig. 14) is bored so as to freely slide on a stationary shaft 37. A keyway is cut in the hub of this slide so that it may slide on key 40, which fits in shaft 37 and has notches 40a, 40b, 40c, 40d, 40e and 40f suitably spaced and located across the top thereof. The shaft 37 is supported by bracket 81 and bracket 38. A dog point screw 44 in bracket 81 keeps the shaft 37 in place and from turning. The slide 34 at 34b is bossed and bored to receive the large end of a plunger 43, which may freely slide therein. The boss is counterbored and tapped so as to receive the screw 41, and this screw is counterbored to receive the plunger 43, which may freely slide up and down therein. A spring 42 is placed in this counterbore and fits around small end of plunger 43. A pin in the projecting end of plunger 43 keeps the plunger in place. The large end of plunger 43 is machined to fit the notches 40a to 40f cut in key 40. A groove 43a is cut in plunger and a pin (not shown) fits this groove and keeps the plunger from turning while allowing it to move up and down. The slide 34 at 34c is fork shaped, and is machined so as to receive one end of lever 45 (see Fig. 1) and this lever 45 at this end has an elongated hole milled therein and this receives the shank of a stud 46, which fits holes in slide 34 and is secured therein by a nut. This lever 45 is bored to receive stud 47, carrying a roll actuated by suitable cams on cam drum 474. The lower end of lever 45 is pivoted to a boss on pan 1 by a stud 49.

*The link belt 322 driving mechanism*

In connection with the shiftable gear mechanism just described is a stationary shaft 50 (see Figs. 2 and 4) supported in the split bearings 4a and 4b. This shaft is held in place and kept from turning by means of pins 78 and 79 in said bearings (see Fig. 4). One end of this shaft is turned down. A link belt gear 52 is bored to receive one end of a bushing 51. A gear 53, which meshes with the gear 22 (see Fig. 7) is bored so as to securely receive the other end of bushing 51. These gears 52 and 53 are connected so as to rotate together, the gear 53 driving chain gear 52. The bushing 51 is bored to fit shaft 50 and freely run thereon. Gears 52 and 53 are held in place by a washer 54 secured to the end of shaft 50 by a screw 55.

*The transmission or spindle driving mechanism*

On this fixed shaft 50 and next to bearing 4b on the inside is gear 57 (see Figs. 2, 3 and 4), which is bored so as to securely receive the bushing 56, and this bushing freely runs on shaft 50. Next to this is a spacer 58 bored to fit shaft 50. Beside this is gear 60 bored to fit bushing 59 and freely runs on said bushing. This bushing is eccentrically bored to fit shaft 50 and is keyed thereon. This eccentric bushing is tapped to receive a screw 77. Next to gear 60 is spacer 61 bored to fit shaft 50 and also drilled to receive screw 77. Beside this is gear 63 (shown in mesh with sliding or shifting gear 27) hereinbefore described (see Fig. 7), which gear 63 is bored to fit the eccentric bushing 62 and freely runs thereon. This bushing 62 is bored eccentrically to fit shaft 50 and is keyed thereon. This bushing is also drilled to receive the screw 77. Next to this is spacer 64 which is bored to fit shaft 50 and is drilled to receive screws 77. Beside this is gear 66 which is bored to fit the bushing 65 and freely runs thereon. This bushing 65 is eccentrically bored so as to fit shaft 50 and is keyed thereon. Bushing 65 is drilled and counter-bored so as to receive part of screw 77. This screw thus holds the bushings 59, 62 and 65 and spacers 61 and 64 together in one unit. Bushing 65 is tapped to receive part of screw 76. Next to bushing 65 is spacer 67, which is bored to fit shaft 50 and also drilled to receive part of screw 76. Beside this is gear 69, which is bored to fit eccentric bushing 68 and freely runs thereon. Bushing 68 is eccentrically bored to fit shaft 50 and is keyed thereon. Bushing 68 is drilled so as to receive part of screw 76. Next to this bushing 68 is spacer 70 which is bored to fit shaft 50 and drilled to receive part of screw 76. Beside this is gear 72,—the last of the six gears,—which is bored so as to fit eccentric bushing 71 and freely runs thereon. Bushing 71 is eccentrically bored to fit shaft 50 and is keyed thereon. Bushing 71 is drilled and counter-bored to receive part of screw 76. This screw 76 thus holds the first unit mentioned above and the spacers 67 and 70 along with bushings 68 and 71 together in one large unit. Bushing 71 is drilled to receive part of pin 74. On inside of bearing at 4a is spacer 73 which is bored to fit shaft 50, and is keyed thereon. This spacer is also drilled to receive a part of pin 74. Key 75 is the means of keying all the eccentric bushings and spacers except 58 to shaft 50, so that all of said eccentric bushings are fixed to the fixed shaft 50 and the ring gears 60, 63, 66, 69 and 72 are rotatable thereon, while the first gear 57 of the set of six also rotates on the shaft 50 but is not eccentrically supported. The frame at 4c is drilled to receive part of pin 74. This pin holds spacer 73 in place and also the large unit referred to above consisting of all eccentric bushings and the spacers between the same. The gears 72, 69, 66, 63, 60 and 57 are idler gears and any may be meshed with gear 27 when desired, by shifting the latter as hereinbefore described.

Shaft 80 cooperates in the following manner with the gears on shaft 50. Suitable bushings are mounted in the split bearings 81a, 4d, 4e and 4f (see Fig. 4) and form bearings for the revolving shaft 80. Gear 82 is keyed and pinned on shaft 80, and is located next to bearing 81a. Gear 83 is also keyed and pinned on shaft 80, and is located between gear 82 and frame 4. Next to split bearing 4d and in mesh with idler gear 72 is gear 84 keyed to shaft 80. Next comes spacer 86 also keyed to shaft 80. Beside this in mesh with idler gear 69 is gear 91 fitting shank of bushing 92 and pinned thereto. Gear 91 is counterbored to receive a roller clutch mechanism consisting mainly of plate 87 (see Fig. 6). This plate is bored so as to fit shaft 80 and is keyed thereon. Key 85 is the means of keying gear 84, spacer 86, and plate 87 to shaft 80. Plate 87 has a suitable number of notches milled therein equally spaced (see Fig. 6). Each of these notches receives a roll 88, and in the straight side of each notch is drilled a hole which receives a spring 89 and a plunger 90. This plunger forces roll 88 away from the straight side of each notch. The flange of bushing 92 acts as a spacer between gear 91 and gear 93, which is in mesh with idler gear 66. This gear 93 fits bushing 94 and is pinned thereto and bushing 94 is bored to fit shaft 80 and freely run thereon. Bushing 92 is bored so as to fit shank of gear 93 and freely runs thereon. This gear 93 is counterbored to receive the cup 95, which is secured by pin 96 and screw 97. This cup is bored to clear boss of gear 93 and is counterbored to receive roll clutch mechanism consisting mainly of plate 98. This plate is milled the same as plate 87 and each of these roll clutch mechanisms is similar to that mentioned above. This roll clutch plate 98 is bored to fit shaft 80 and is keyed thereon. Beside gear 93 is spacer 100, which securely fits shank of plate 98. Next to this is gear 103 bored to fit bushing 104 and pinned thereto, and bushing 104 is bored to fit shaft 80 and freely runs thereon. Gear 103 is counterbored to receive cup 102, which receives roller clutch mechanism (the plate of which is 101) which is similar to that shown in Fig. 6. Cup 102 is similar in design to cup 95. Roll plate 101 is bored so as to fit shaft 80 and is keyed thereon. Key 99 is the means of keying the roll plates 98 and 101 to shaft 80. The flange of bushing 105 acts as a spacer between gear 103 and gear 106 in mesh with idler gear 60. Bushing 105 is bored to fit the shank of gear 103 and freely runs thereon. Gear 106 is bored to fit shank of bushing 105 and is pinned thereto. Gear 106 is counterbored so as to receive cup 107 which receives roll clutch mechanism (the plate of which is 108) similar to roller clutch mechanisms already described. Cup 107 is similar in design to cup 95. Plate 108 is bored so as to fit shaft 80 and is keyed thereon. Plate 108 is counterbored to allow clearance of boss of gear 106, shank of bushing 105, shank of gear 103, and bushing 104. Spacer 110 is bored so as to securely fit shank of plate 108. Next to this is the last gear 111 in mesh with idler gear 57. Gear 111 is bored to receive bushing 116 and is pinned thereto. Gear 111 is also counterbored to receive the cup 112, which receives the roller clutch mechanism (the plate of which is 113), this mechanism being similar to those described. Cup 112 is similar in design to cup 95. Roll plate 113 is bored to fit bushing 114 and is keyed thereon, by key 115. Bushing 114 is bored to fit shaft 80 and is keyed thereon. Bushing 116 is bored to fit shank of bushing 114 and freely runs thereon. The shank of gear 111 is turned down to fit in bore of bushing (mounted in split bearing 4e) and freely runs therein. A gear 120 on other side of bearing 4e fits the shank of a clutch cup 118 and is keyed thereon. Clutch cup 118 is bored to receive a bushing 119 and is pinned thereto. Bushing 119 fits shaft 80 and freely runs thereon. The ends of shanks of gear 111 and clutch cup 118 are counterbored and in the space formed thereby an end thrust washer 117 is placed, which freely fits shaft 80. Next to bearing 4f is gear 135 which is bored to fit shank of clutch cup 129 and is keyed thereon. Clutch cup 129 is bored to receive a bushing which in turn is bored to fit shaft 80 and freely runs thereon. The large ends of the clutch cups 118 and 129 are counterbored to receive the double friction clutch mechanism, the parts shown of which are rings 121 and 124, sleeves 122 and 125, clutch sleeve 123, fingers 122a, and wedges 123a (see Fig. 18). Sleeves 122 and 125 are bored to fit shaft 80 and are both keyed thereon by key 126. The flanges of sleeves 122 and 125 are broached so as to receive plungers 132, which freely slide therein. Clutch sleeve 123 (see Fig. 4) is bored to fit shanks of sleeves 122 and 125 and freely slides thereon. Clutch sleeve 123 is tapped from both sides to receive threaded ends of plungers 132. These tapped holes are counterbored and receive the larger shanks 132a of plungers 132. In front of these and in same counterbores are the springs 133 thru which the smaller shanks of plungers 132 pass. The nuts 134 are for adjusting and keeping in place the plungers 132.

As shown in Fig. 18, each clutch ring or sleeve 122 and 124 is split at 121a and within these splits or openings are inserted a pair of fingers 122a pivoted to each sleeve 122 and 125. A wedge 123a is secured to opposite faces of the clutch sleeve 123, and in operation when the member 123 is shifted toward the clutch ring 124 or 121, as the case may be, the wedge 123 will be driven between the fingers 122a, thus spreading the fingers and expanding the ring 124 or 121 into frictional engagement with clutch cup 129 and the sleeve 125, or clutch cup 118 and sleeve 122, as the case may be.

In mesh with gears 120 and 135 are a pair of gears carried on a shaft 418 (see Figs. 12, 13 and 3) and by means of which shaft 418 the work spindle is driven as now to be described. Caps 419 and 420 (see same Figs. 12 and 13) are securely mounted on brackets 7 and 6 respectively and are of such design in connection with these brackets as to form split bearings. These bearings are bored to receive bushings 416 and 417, which are pinned thereto. These bushings are bored to fit shaft 418, which freely runs therein. Next to bearing 7a is a gear 421, which is keyed to shaft 418. Next to this is gear 423, which is also keyed to shaft 418.

Between gear 423 and bearing 6a is gear 425, which is likewise keyed to shaft 418. The bracket 7 at 7b is bored to receive stud 428, which is held therein by a set screw. Gear 429 (mounted only when reverse speed is desired and referred to hereinafter) is bored to securely receive bushing 430, which in turn is bored to fit stud 428 and freely rotates thereon. The flange of stud 428 maintains gear 429 in place. Gear 425 meshes with gear 120 on shaft 80 (see Fig. 4) while gear 421 meshes with gear 135 on shaft 80. When the idler gear 429 is desired gear 421 is replaced by a similar gear but with less teeth. In that case (with gear 429 mounted) the substituted gear with less teeth, meshes with said gear 429, which in turn meshes with gear 135 on shaft 418. Gear 423 on said shaft 80 meshes with gear 144 on main spindle hereinafter described (see Fig. 3).

*Operation of the spindle driving mechanism*

The mechanism so far described operates as follows, and many advantages and improvements will be observed:

The source of power coming thru pulley 14, Fig. 7 (or when a motor is used, a gear in place of pulley 14) to driving shaft 10 drives gear 13, and thus gear 18 which drives shaft 19. The angular drive shaft 19 thus rotates shiftable gear 27, which is shifted by bracket 28 by means of rod 31, shaft 30 merely acting as a guide for bracket 28 to travel on. The shifting rod 31 is shifted longitudinally by means of slide member 34 (see Fig. 14). The springs 35 and 36 act as cushions in case the teeth of gears should clash when slide moves one way or the other against the lock nuts 32 and 33 (Fig. 7). The travel of shifting rod 31 is adjustable thru these lock nuts 32 and 33. The slide 34 is moved by lever 45 and cams on cam drum 474 on the cam shaft. The cams are suitably machined and timed to give the correct position at the desired time. After these cams have thru lever 45 shifted slide 34, this slide 34 is suitably held in position (and hence gear 27) by plunger 43 (see Fig. 14) falling in one of the notches in the key 40. These notches are machined at suitable locations so that shifting rod 31 and hence gear 27 is held in the desired position at all times. When the plunger 43 is in, say, notch 40a the gear 27 is in mesh with gear 57; when in notch 40b with gear 60, etc. When the shifting gear 27 is in mesh with the idler gear 72, it drives gear 84 (see Fig. 4), which in turn drives shaft 80 by means of key 85. When the gear 27 is in the foregoing position it is driving shaft 80 at its maximum speed. The key 85 also drives roller plate 87 and spacer 86. By means of this roller clutch, the plate 87 is not connected with gear 91 when gear 27 is in above position. When shifting gear 27 is in mesh with idler gear 69, which in turn is in mesh with gear 91, the roller plate 87 is connected with gear 91 by means of roller clutch. Therefore the gear 27 in this position drives shaft 80 at a slower speed than thru 84. When gear 27 is not in mesh with gear 72 the gear 84 runs idle. When gear 27 is in mesh with idler gear 66, it drives gear 93. This in turn drives roller plate 98 by means of roller clutch mechanism. The roller plate 98 drives shaft 80 by means of key 99. With gear 27 in mesh with 66 the shaft 80 runs at a slower speed than thru gear 69. When gear 27 is in mesh with idler 63, which is in mesh with gear 103, it drives roller plate 101 by means of roller clutch mechanism and this in turn drives shaft 80 by means of key 99. When in this position the roller plate 98 is not connected in any way with the gear 93. When in this position the rate of speed of the shaft 80 is still slower. When the gear 27 is in mesh with idler gear 60, which meshes with gear 106, this gear 106 drives roller plate 108 by means of roller clutch mechanism, which drives shaft 80 by means of key 109 at a slower speed than the one just before mentioned. When the gear 27 is in mesh with the idler gear 57, which is in mesh with gear 111, this gear 111 drives roller plate 113 by means of roller clutch mechanism. This plate 113 drives the sleeve 114 by means of key 115 and this in turn drives the shaft 80 by means of key 109; the roller plate 108 now is in no way connected with gear 106. When gear 27 is in this last position mentioned the shaft 80 is, thru this gear transmission, at its lowest speed.

By the phrase "roller or roll clutch mechanism" in the above operation is meant the following:

When roll plate 87 is being driven in direction of arrow (see Fig. 6) by shaft 80 at a greater rate of speed than that at which gear 91 is going, the roll 88 is forced against plunger 90 and toward side of notch 87a and roll 88 is not in any way in contact with gear 91; now when gear 91 is driven at a greater speed in direction of arrow than roll plate 87 is being driven, the wall of counterbore in gear 91 catches the roll 88 (with help of spring 89 and plunger 90) and wedges same and hence driving roll plate 87 and in turn driving shaft 80. The above description describes just one of these rolls in action whereas any suitable number may be used and in the case of the gears 93, 103, 106 and 111 instead of using the walls of counterbores (which must be hardened and of special steel) for driving rolls, a steel ring as described hereinbefore is used for this purpose.

The above transmission of speed by means of the operation above described is an important feature and is automatic in operation thruout. When a slow or fast spindle speed and tool feed is desired, all that is necessary is a suitable cam on drum 474. An important advantage of this transmission is the fact that, when this sliding gear 27 is automatically shifted from one idler to another and at times may be in mesh with two, the idler that drives shaft 80 the faster, runs away from the other. This of course all happens when this improved machine is in operation and is very rapid.

The shaft 80, thru gears 120 and 135 and key 126 and friction clutches (see Fig. 4) drives gears 421 and 425 on shaft 418 (see Figs. 12 and 3), which drives shaft 418 so that gear 423, located midway thereon, drives gear 144 on main spindle 140, thus driving the main spindle. The spindle 140 can be driven either right or left handed at any time desired by means of suitable cams on drum 482 and levers hereinafter described for shifting the clutch sleeve 123 (see Fig. 4). When the spindle runs right handed the clutch sleeve 123 (Fig. 4) is in connection with clutch 121 and gear 120 is driving shaft 418 through gear 425. When reverse drive is desired, the sleeve 123 is shifted into connection with clutch 124 to drive gear 135 and this gear being in mesh with idler gear 429 (Figs. 12 and 13) drives it and thereby gear 421 on shaft 418 is driven and thereby the spindle thru gear 423 on said shaft 418 and gear 144 on the spindle.

*The clutch sleeve 123 shifting mechanism*

The frame, (see Figs. 15 and 16) at 4ac is bored to receive the shank of bushing 517, which in turn is broached to fit a hexagon shaft 518, and this bushing 517 is secured to the hex shaft by means of a set screw in the flange of said bushing. On the inside of the frame is a lever 519, which is broached to fit hex shaft 518. This lever at 519a is bored to receive a thrust pin 520, which is secured therein by a screw 520a. The lever 519 at 519b and 528b (see Fig. 15) is slit and then drilled, tapped and counterbored at right angles to the slit and a screw is fitted therein so as to provide a suitable means by which the lever may be tightened on hex shaft 518. Next to lever 519 is a lever 521, which is bored so as to receive the shank of bushing 522. This bushing is broached so as to fit shaft 518 and is secured thereon by means of set screw in the flange of said bushing. Lever 521 at 521a and 521b (see Fig. 15) is tapped so as to receive the adjusting screws 523 and 524 respectively. The ends of these adjusting screws fit in concave ends of thrust pin 520. Lever 521 at 521c carries a stud 525, which holds roll 526 in place. The frame at 4ad is bored so as to receive bushing 527 which is broached to receive other end of hex shaft 518. Next to bearing 4ad is the lever 528, which is broached to receive the hex shaft 518. This lever 528 at 528a is drilled to receive pin 529. The link 530 at 530a is also drilled to receive pin 529. This link at 530b is drilled to receive pin 531, and the lever 532 is drilled at 532a to receive said pin 531. The frame at 4ae and at 4af (see Fig. 23) is bored to receive shaft 533. The lever 532 at 532b fits this shaft 533 and is pinned thereon, thus forming a fulcrum for said lever. This lever at 532c and 532d is drilled to receive the shanks of shoes 534. These shoes fit in recess of sliding clutch sleeve (see Fig. 4) 123 of the clutches on transmission gear shaft 80.

The roll 526 (see Figs. 15 and 16) is shifted by means of a suitable cam on cam drum 482, thus swinging lever 521. The arms 521a and 521b of this lever, thru adjusting screws 523 and 524 shift lever 519 in the same direction as lever 521. This in turn rocks the hex shaft 518, which thus shifts lever 528, and this lever 528 thus pulls or pushes as the case may be, the link 530, which in turn acts upon the lever 532 and thru the shoes 534 shifts the clutch sleeve 123 and so operates one or the other of the friction clutches on shaft 80.

*Construction of the work spindle*

In the frame 4 (see Fig. 5) are the high speed spindle bearings 4g and 4h, and mounted to run freely in these bearings is a main spindle 140. An end thrust bearing 141 is mounted on the spindle and is pinned to frame 4 at 4g and next to this is a floating ring 142 and next to this is a ring 143. Next to ring 143 is mounted main spindle drive gear 144, which meshes with gear 423 on shaft 418 (see Figs. 3 and 12), and which shaft 418 is operated from transmission gear shaft 80 as just described. This gear 144 is keyed to the spindle 140 by the key 145, and is held in position by lock nuts 146 and 147 screwed on the spindle 140. The front or nose of the spindle 140 is so constructed as to receive a regular Acme draw or pull back chuck 148. On inside face of the bearing 4h, a thrust ring 149 is mounted on the spindle. Against this ring is placed the end thrust bearing 150. Against the end thrust bearing 150 is housing 151. Next to the housing 151 is placed spacer 152 and suitably held to this is ratchet ring 153. The housing 151, spacer 152 and ratchet ring 153 are keyed to the spindle 140 by the key 154. Next to the ratchet ring 153 is mounted gear 155, bushed with a suitable bushing, which runs freely on spindle 140. The gear 155 is suitably counterbored to receive teeth on ratchet ring 153. The gear 155 is also drilled, broached, counterbored, and tapped at suitable locations. The broached hole receives the square plunger 157 and the tapped hole receives the special screw 158. The plunger 157 and screw 158 are drilled to receive spring 159. The ratchet ring 153, the plunger 157, the screw 158 and spring 159 form a ratchet clutch. Next to gear 155 is end thrust spacer 160. Next to this is gear 161. This gear 161 is of similar design as gear 155 having the same clutch mechanism as gear 155. The spindle 140 is suitably recessed to receive the split collar 162 and split ratchet ring 163, which is similar to ratchet 153 with the exception that 153 is not split, and the split ratchet ring 163 is suitably held to the split collar 162. The split collar is held together by screws 164. A wedge spool 165 is mounted in the spindle 140 in the rear of bearing 4h and slides freely thereon. The rear end of the spindle 140 is threaded to receive the finger holder 166. This finger holder is adjustable to control the grip of chuck 148 on the work and when adjusted is held securely by a brass shoe and set screw. There are three suitable slots milled on the outer face of finger holder 166 to receive three wedge fingers 169. Each of these fingers 169 at 169a is drilled and slotted to receive a roll 170 held by stud 171, while fingers 169 are held and pivoted in finger holder 166 by a stud 172. The fingers at 169b bear against a hardened ring 173. A thrust ring 175 is machined so as to receive ring 173, and this thrust ring 175 is pressed on to shoulder on rear end of pull tube 176, the screws 177 holding it thereon. The pull tube 176 is machined so as to press freely into the spindle 140. The front end of the pull tube 176 is tapped to receive Acme chuck 148. The pull tube 176 is bored so as to receive feed tube 178, the front end of which is counterbored to receive stock support ring 179, and is tapped to receive an Acme feed collet 180. A steel bushing 181 is mounted and riveted on feed tube 178, and this bushing 181 is counterbored to receive bushing 182. In front of the flange of bushing 181 is mounted end thrust bearing 183. This bearing receives the pressure of stock feed collet 180 in backward motion over the stock. Next to the bearing 183 is the boss of a bracket 184a, which is suitably bored to receive bushing 185. This bushing 185 forms a free running surface for steel bushing 181. On the inside of the boss of bracket 184a is a steel washer 186 and next to this are adjusting lock nuts 187 screwed on to bracket 184a.

A bracket 314 (see Fig. 19) is rigidly secured to the frame 4 and in the boss of which is a bushing bored to receive a shaft 315 and freely runs therein. This bearing at 314a is counterbored to receive an end thrust bearing 316. Near the other end of shaft 315 there is keyed and pinned a link belt gear 318, which is connected with link belt gear 52 of stationary gear transmission shaft 50 (see Fig. 4) by a link belt 322 (see Fig. 1) and this gear 318 is driven thru the link belt by gear 52, which is fixed to gear 53 (see Fig. 4) and both of which rotate on the end of gear transmission shaft 50, and are driven by the gear 22 (see Fig. 7) as hereinbefore explained. A bracket 319 is also rigidly secured to frame 4, the boss of which at 319a is bored to securely receive a bushing 320. This bushing is bored to receive the turned down end of shaft 315, which freely runs therein. A gear 321 is mounted on this turned down part of shaft 315 and is also keyed thereon.

*The power feed or cam shaft driving means*

The bracket 319 at 319b is bored to securely receive bushings 323, which receive shaft 324 running freely therein. This shaft 324 has gear 325 keyed thereto and it is in mesh with gear 321. Screw 326 and washer 327 keep gear 325 in place.

The opposite end of shaft 324 carries a bevel 328 pinned thereto. Between gear 328 and boss 319b of bracket 319 is located an end thrust bearing 329, and the bracket 319 and gear 328 are counterbored to receive this end thrust bearing 329. The bevel gear 328 back of its teeth carries sprocket 330 fixed thereto. The shaft 324 thru its bevel gear 328 rotates the cross shaft 333 (see Fig. 9) as now to be explained.

A housing 331 (see Figs. 9, 10 and 11) is rigidly secured to frame 4. This housing at 331a securely receives bushing 332, which receives shaft 333 freely running therein. The main frame at 4n, 4p and 4q (Fig. 9) are all bored to securely receive bushings 334, 335 and 336 respectively and these bushings receive the shaft 333, which freely runs therein. Next to boss 331a is a friction disc 337, which fits and is keyed to shaft 333 at 331b. The bracket 331 is drilled to receive the shank of shoe 338 (see Fig. 10). The concave part of this shoe 338 fits the periphery of friction disc 337 and at the end of its shank receives spring 339. A set screw 340 in the bracket receives the other end of this spring 339. Next to friction disc 337 is clutch sleeve 341 keyed to shaft 333. A sliding grooved sleeve 342 fits on sleeve 341 and shoes 358 hereinafter described fit therein. One end of this sliding sleeve 342 is constructed to house boss 344a of bevel gear 344, which as hereinafter described, meshes with bevel gear 328 (see Fig. 19). The sliding sleeve 342, the clutch sleeve 341 and the boss 344a of bevel gear 344 are so constructed as to receive the friction clutch mechanism, of which ring 343 is a part. This forms "Clutch B". The bevel gear 344, which as just stated, is in mesh with bevel gear 328, is bored to securely receive the bushing 345, which fits on shaft 333. Gear 344 is counterbored at 344b so as to receive the end thrust bearing 346, which fits shaft 333. Another gear 347 is pinned to shaft 333, being located between bearings 4p and 4q. A clutch sleeve 348 is bored to receive bushing 349 and this bushing 349 is bored to fit shaft 333. This clutch sleeve 348 at 348a is turned down and gear 350 is fixed thereto. The clutch sleeve at 348b is counterbored and houses friction clutch mechanism. A clutch sleeve 351 fits on shaft 333. The outside of this sleeve 351 is machined so as to receive parts of the friction clutch mechanism. A grooved wedge ring 352 is bored to fit shaft 333, and this ring 352 is counterbored at one end so as to partly house the clutch mechanism. In the groove of this ring fits a shoe hereinafter described. The ring 352 is drilled to receive shank of wedge 353. Next to this ring 352 is a crank 354 adapted to fit end of shaft 333. The shaft 333 at this end is milled and receives pivoted latch lever 355. The frame 4 at 4r is bored so as to allow clearance for sleeve 348.

A bracket at 331c (see Fig. 10) and at 331d is drilled to receive shaft 356, on which clutch lever 357 is mounted, the lever being bored at 357a to fit this shaft 356, and it is pinned thereon. The forks of this lever 357 receive the shanks of shoes 358 (one of which is shown). These shoes 358 fit the groove of sleeve 342 hereinbefore described. The lever 357 at 357b (see Fig. 10) receives the shank of stud 359. One end of a rod 360 also fits on shank of this stud 359. Near the other end of rod 360 there is an elongated slot which receives stud 361. Rod 360 at one end of this elongated hole is counterbored and receives the end of a releasing lever 362, which fits on stud 361. This lever 362 is counterbored and receives a spring 363 (see Fig. 11) and also a washer 364. This lever is suitably cut away so as to receive a pin 365 secured in stud 361. The frame 4 at 4a (see Fig. 11) receives stud 366 securely held therein. The bracket 367 at 367a is also bored so as to receive a bushing 368 and this bushing 368 fits on shaft 366, which is tapped at one end to receive screw 369, which holds washer 370 in place. The bracket 367 at 367b is drilled and counterbored to receive stud 361. This stud 361 is threaded at each end and at end 361a receives a nut 371 which holds washer 372 in place. At the other end 361b the stud 361 receives nut 373. In bracket 367 on each side of rod 360 there is a screw 374. Bushings 375 and a plate 376 fit on these screws 374, and form a suitable housing for rod 360. The bracket 367 at 367c receives screw 377, the threaded part of which receives a cam 378 kept from turning by a suitable pin.

The frame (see Figs. 5, 20 and 21) is bored at 4t and counterbored to securely receive a bushing, which receives a shaft 380. A washer 381 (see Fig. 5) fits on shaft 380 and is kept from turning by means of a pin. Next to this washer 381 is a worm 382 keyed to shaft 380. Next to worm 382 is a washer 383, kept from turning by a pin. The frame 4 at 4u is also bored to securely receive a bushing 384. Next to bearing 4u is gear 385 pinned to shaft 380. This gear 385 is in mesh with gear 155 on main spindle. Next to gear 385 is gear 386, which is pinned to shaft 380. This gear 386 is in mesh with idler gear 392 (see Fig. 20) hereinafter described. The frame 4 at 4v is bored so as to receive bushing 387, which receives end of shaft 380. A bushing 388 fits on bosses of gears 385 and 386. This bushing is split for assembling purposes. A swinging arm 389 (see Fig. 20) is at 389a of such construction as to form with a cap 390 a split bearing, and this split bearing fits on bushing 388. This arm at 389b receives a stud 391, which carries idler gear 392 in mesh with gear 386 of shaft 380 and gear 161 of main spindle (see Fig. 21).

The arm 389 at 389c receives a pin 393. A bracket 394 is rigidly secured to the bed and this bracket at 394a has two holes at a suitable distance apart and at equal distance from center of shaft 380. Either one of these holes receives the pin 393. The frame 4 at 4w (see Fig. 21) is bored to receive bushing 395, and this bushing receives the turned down end of shaft 396. Next to frame 4w is a worm gear 397 on shaft 396 and is in mesh with worm 382 of shaft 380 (see Figs. 5 and 20). The worm gear 397 is counterbored and chamfered so as to receive a clutch ring 399 securely held therein. This ring 399 is counterbored so as to form a shoulder and housing for flange of bushing 398. Clutch ring 399 is counterbored a second time so as to suitably receive a roller plate 400. This plate has three notches cut on its periphery at equal distance from each other. These notches receive rolls 401 and the notches are each drilled to receive a plunger and spring, such as 90 and 89, hereinbefore described in connection with Fig. 4. The ring 399, the plate 400, rolls 401 and plungers and springs together form a roller clutch the same as used in gear transmission on shaft 80. The plate 400 is bored to securely receive a bushing 402 and this in turn is bored to receive the shaft 396 which freely runs therein. Next to plate 400 and rigidly held by means of screws and pins is a collar 403. This collar is bored to fit shaft 396 and is held thereon by a key. Next to collar 403 the shaft 396 is so machined as to form a gear 396a which meshes with gear 350 hereinbefore described on shaft 333 (see Fig. 9 and also Fig. 3). The opposite end of shaft 396 is carried by the frame 4 at 4x bored to receive a bushing, which receives the end of this shaft 396 and a washer 405 is held to frame 4x by screws.

The frame at 4z and 4y (see Fig. 17) is bored to receive a short shaft 406 running parallel with shaft 333 of Fig. 9, and is secured by screws. A gear 407 securely receives bushing 408, which in turn is bored to fit shaft 406. This gear 407 is located between the bearings 4y and 4z and meshes with gear 347 on shaft 333 (see Figs. 3 and 9). The frame 4 at 4aa and at 4ab is bored to receive stationary worm shaft 409. Next to bearing 4aa is end thrust washer 410 which fits shaft 409. Next to this is gear 411, in which is bushing 412 which is bored to fit this stationary worm shaft 409. Gear 411 is counterbored a little and receives washer 410. This gear 411 is in mesh with gear 407, and one end is machined to couple with end of worm 413, which worm is bored to securely receive a part of bushing 412 and all of bushing 414, which latter fits on shaft 409. Next to worm 413 is an end thrust washer 415, which fits on shaft 409.

The operation of the power feed and cam shaft

The driving of the main spindle 140 in either direction has hereinbefore been described. Hence the ratchet plate 153 (see Fig. 5) drives the gear 155 thru plungers 157. When the spindle is revolving right handed the gear 161 remains idle (the plungers passing over teeth of ratchet plate 163). The gear 155 drives the gear 385 (see also Figs. 20 and 21), which in turn drives shaft 380. When spindle 140 is driven left handed the above operation reverses itself, the gear 161 becomes the driver and gear 155 is idle. The gear 161 drives the idler gear 392 which drives the gear 386, that in turn drives shaft 380. By means of this idler gear 392 the shaft 380 is driven in same direction at all times regardless of which way the spindle is driven. In case spindle 140 only runs in the one direction (right hand) the idler gear 392 may be disengaged from gear on spindle 161 by taking out pin 393 (see Fig. 20) from position 394b, and swinging arm 389 away from spindle and inserting the pin 393 in position 394c. The point is to keep gear 161 from acting on ratchet plate 163 and plungers 157 and hence wearing them out. The worm 382 keyed to shaft 380, drives the worm gear 397 (see Fig. 21) which in turn drives the roller clutch cup 399. This cup drives roller plate 400 thru the rollers 401. This is the same mechanism as explained in gear transmission (Fig. 6). The roller plate drives the collar 403 which drives the shaft 396. The gear 396a cut in shaft 396 drives gear 350 on shaft (see Fig. 9) 333. This gear 350 drives the clutch cup 348 which drives the shaft 333 when desired thru the clutch "A", consisting of ring, fingers, and clutch sleeve 351 keyed to shaft 333. The gear 347 is driven by shaft 333. Coming back now to shaft 315, which is driven (thru gears 22) by the chain 322, this shaft 315 drives gear 321 which in turn drives gear 325. This gear drives shaft 324, and this shaft 324 drives bevel gear 328, which bevel gear drives bevel gear 344 on shaft 333 (see Fig. 9), which in turn drives said shaft 333 thru the clutch "B" consisting of ring 343, fingers, and clutch sleeve 341 (keyed to shaft) when engaged. When shaft 333 is driven thru clutch "A" (the sleeve of which is 351) it is on its slow feed. This slow feed is controlled by main spindle 140 and hence changes speed with same. The gear 347 on this shaft 333 is driven by this slow feed mechanism only when clutch "A" is engaged and the clutch "B" is disengaged. When clutch "B" is engaged the shaft 333 is driven much faster than when same is disengaged. When clutch "B" is engaged the clutch "A" can be either engaged or disengaged. This is made possible by means of roller clutch on shaft 396 (see Fig. 21). The action of this roller clutch is the same as the one shown at Fig. 6 used on gear transmission shaft 80. This action in short is—when worm gear 397 (Fig. 21) is driving cup 399 and roller plate 400 is either stopped or going at a slower rate of speed than cup 399, this cup 399 locks with rolls 401 and hence drives shaft 396 thru collar 403. When roller plate 400 is driven at a higher rate of speed (when both clutches "A" and "B" are engaged) than cup 399 then the rolls 401 unlock and hence there is no connection between roller plate 400 and cup 399. The clutch "A" is operated when desired by hand, while the clutch "B" is also operated by hand when desired but it also may be operated automatically by suitable dogs. These dogs act on cam 378 (see Fig. 9) and by means of lever 367 and hand lever 362 operate the rod 360 back and forth, thus in turn thru yoke lever 357 and shoes 358 engaging or disengaging clutch "B". By pulling handle 362 (see Fig. 9) down 90° the end 362a acts on a pin in stud 361 (see Fig. 11), and handle disengages itself from counterbore in rod 360. This causes stud 361 to act freely in elongated slot at 360a (see Fig. 10) and hence lever 367 has no connection with rod 360 which is desirable at times for setting-up purposes. When handle 362 is pushed back the spring 363 being compressed acts on handle and forces it back into counterbore of rod 360 when same is in position. This makes the connection between lever 367 and rod 360. This handle is a new improvement on the machine.

The gear 347 (see Fig. 9; and also Fig. 17) which is driven by the shaft 333, drives the idler gear 407 on stationary shaft 406. This idler gear in turn drives the gear 411 on stationary shaft 409, and this gear 411 is coupled to and drives the worm 413 which is also on shaft 409, and this worm 413 in turn drives the cam shaft thru worm wheel 480 of cam drum 475. For the general assemblage of these several shafts just described, see Fig. 3.

The cam shaft and cam drums

The bracket 188 (see Fig. 1) at 188a and the column 3 and 3a and column 2 and 2a are bored to receive the cam drum cam shaft 470. A cam drum 474 is keyed and pinned to cam shaft 470 and on the periphery of this drum there are tapped holes at convenient places to receive screws which in turn secure suitable cams to the drum. Next to this is the main cam drum 475, which is also keyed and pinned to cam shaft 470. On the periphery of this main cam drum there are also tapped holes at convenient places to receive screws that secure suitable cams to the drum. Secured to the main cam drum is a worm gear 480, which is secured thereto by means of suitable screws, and this worm gear 480 is in mesh with worm 413 of shaft 409 (see Fig. 17) and which, as hereinbefore stated, is driven from shaft 333. The cam shaft also carries cam carrying disks 481 and 483 and cam drum 482.

*Main spindle drive*

Pulley 14 on shaft 10 (see Fig. 7) thru gear 13 and gear 18 of hex shaft 19, rotates shiftable gear 27, which, according to its position rotates any one of the six idler gears on shaft 50 (Fig. 4) and thereby any one of the six gears carried by shaft 80.

Shaft 80, thru gears 120 and 135 and the friction clutches (Fig. 4) drives gears 425 and 421 of intermediate shaft 418 (see Fig. 12) and gear 423 of this shaft 418 drives the gear 144 and thereby main spindle 140, the spindle being run either right or left handed, according to whichever friction clutch gear 120—135 is used. When spindle runs right handed, clutch gear 120 is driving gear 425 of intermediate shaft 418, the gear 423 of which is in mesh with gear 144 of the main spindle. When the reverse drive is used, the opposite clutch drives gear 135, which in mesh with an idler gear 429 (Fig. 13) drives it and thereby gear 421 on said shaft 418, and thus gear 144 of the main spindle.

The friction clutch sleeve 123 (Fig. 4) is shifted through the mechanism shown in Figs. 15 and 16 thru the cam drum 482 on the cam shaft.

The shiftable gear 27 is shifted by rod 31 (Fig. 7) and rod 31 is shifted by lever 34 (Fig. 14), which is shifted by lever 45 and suitable cams on cam drum 474.

*Chain drive*

Going back to sliding gear 27 and its shaft 19 (Fig. 7), gear 22 thereon meshes with loose gear 53 on stationary gear transmission shaft 50 (see Fig. 2). Fixed to gear 53 is chain gear 52 also loose on shaft 50. Chain 322 is thus driven by loose gear 53 from main source of power, and this chain drives chain gear 318 on shaft 315 (see Fig. 19).

*Slow and fast feed*

The main spindle 140 runs in either direction and drives shaft 380 (see Fig. 5) thru gears 155 and 161 always in the same direction.

*Slow feed*

Worm 382 on shaft 380 (see Fig. 5) drives worm gear 397 of short shaft 396 (see Figs. 21 and 3). Gear 396a of short shaft 396 drives gear 350 through clutch "A" and this gear 350 drives gear 347 of said shaft 333, which drives gear 407 of short shaft 406 (Fig. 17) and this gear 407 drives worm 413, which drives main cam shaft thru drum 475.

*High speed*

Chain 322 to shaft 315 (Fig. 19) drives shaft 324 by gears 321 and 325. Shaft 324 drives bevel gear 328 which drives bevel gear 344 of shaft 333, which thru clutch "B" drives said shaft 333.

Referring to Figs. 22 and 23, it will be noted that the variable speed gearing or transmission mechanism in this instance may be housed within a suitable gear box 500. The rotary driving shaft 19 extends through the gear box and is journaled in suitable bearings carried thereby. The fixed or stationary shaft 50 is pinned to bosses formed in opposite sides of the box 500, and the rotary driven shaft 80 is journaled in bearings carried by the gear box. A sliding actuating rod 31a extends through the gear box, and a forked or bifurcated actuator 501 is mounted on the rod 31a and secured in adjusted position by means of a set screw 502. The actuator 501 projects into a groove in a spool 27a carried by the sliding gear 27.

As shown in Fig. 22, the gear 27 is in neutral position, and by shifting the rod 31a, gear 27 will be shifted along the shaft 19 into mesh with any one of the variable speed gears 504, 505 and 506, which are eccentrically mounted as in the case of the gears 57, 60, 63, etc. above described, upon the fixed shaft 50. The gears 504—506 mesh with gears 508—510, whereby the shaft 80 may be driven at different speeds in one direction. The gear 503 mounted on shaft 50 meshes with gear 507 on shaft 80, and these gears are utilized thru suitable mechanism to rotate the shaft 80 in the opposite direction upon shifting the sliding gear 27 into mesh with gear 503.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a metal working machine, the combination of a drive shaft, a rotary spindle, a cam shaft, means for rotating said spindle at different speeds, means directly connected to said spindle for driving said cam shaft from the spindle at different speeds, clutch mechanism for disconnecting the cam shaft from the spindle, and means for independently driving the cam shaft from said drive shaft.

2. In a metal working machine, the combination of a drive shaft, a rotary spindle, a cam shaft, a pair of shafts, sets of variable speed gearing carried by said shafts, means for connecting the drive shaft with any of said sets of gearing to operate the spindle at different speeds, means for driving the cam shaft from the spindle at different speeds, clutch mechanism for disconnecting said last means, and means for driving the cam shaft from the drive shaft independently of the spindle.

3. In a metal working machine, the combination of a drive shaft, a rotary spindle, a cam shaft, a pair of shafts, sets of variable speed gearing carried by said shafts, means for connecting the drive shaft with any of said sets of gearing, clutch mechanism for connecting any of said sets of gearing with the spindle to rotate the same at different speeds in different directions, means for driving the cam shaft from the spindle at different speeds in a constant direction, and means for driving the cam shaft from the drive shaft independently of the spindle.

4. In a metal working machine, the combination of a drive shaft, a driven shaft, a cam shaft, variable speed gearing for operating said driven shaft at different speeds from the drive shaft, means for driving said cam shaft from said driven shaft independently of the drive shaft, and means for driving said cam shaft from said drive shaft independently of the driven shaft.

5. In a metal working machine, the combination of a drive shaft, a cam shaft, a driven shaft, gear transmission mechanism for rotating said driven shaft at different speeds from said drive shaft, and mechanism connected to said driven shaft for driving said cam shaft from said driven shaft independently of the drive shaft, and means for driving said cam shaft from the drive shaft independently of the driven shaft.

Signed at Cleveland, Ohio, this 21st day of September, 1925.

ALFRED E. DRISSNER.